(12) United States Patent
Yuan et al.

(10) Patent No.: US 12,346,659 B2
(45) Date of Patent: Jul. 1, 2025

(54) INFORMATION EXTRACTION AND IMAGE RE-ORDERING USING PROMPT LEARNING AND MACHINE-READING COMPREHENSION

(71) Applicant: INTERNATIONAL BUSINESS MACHINES CORPORATION, Armonk, NY (US)

(72) Inventors: Zhong Fang Yuan, Xi'an (CN); Tong Liu, Xi'an (CN); Si Tong Zhao, Beijing (CN); Xiang Yu Yang, Xi'an (CN); Ziqiumin Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 18/148,952

(22) Filed: Dec. 30, 2022

(65) Prior Publication Data
US 2024/0220727 A1    Jul. 4, 2024

(51) Int. Cl.
*G06F 17/00* (2019.01)
*G06F 18/214* (2023.01)
(Continued)

(52) U.S. Cl.
CPC ............ *G06F 40/30* (2020.01); *G06F 18/214* (2023.01); *G06F 18/2413* (2023.01); *G06V 30/19093* (2022.01)

(58) Field of Classification Search
None
See application file for complete search history.

(56) References Cited

U.S. PATENT DOCUMENTS 11,366,972 B2 * 6/2022 Kehler ................. G06F 16/355
2020/0349183 A1 * 11/2020 Jayaraman ............ G06N 20/00
(Continued)

FOREIGN PATENT DOCUMENTS

CN       109934213 A    6/2019
CN       112395996 A    2/2021
(Continued)

OTHER PUBLICATIONS

Patel, S. et al., "Abstractive Information Extraction from Scanned Invoices (AIESI) using End-to-end Sequential Approach," arXiv preprint, arXiv:2009.05728. Sep. 12, 2020, 6 pg.
(Continued)

*Primary Examiner* — Satwant K Singh
(74) *Attorney, Agent, or Firm* — Harrity & Harrity, LLP

(57) ABSTRACT

Information extraction and image restructuring includes generating semantic vectors to encode portions of text extracted from a document. For each semantic vector a semantic similarity between a schema key and other text encoded therein is determined based on their respective positions within the document. An enhanced NLP model is created using the semantic vectors, each labeled according to the semantic similarity. The text, including schema key, are re-encoded as a key and candidate vectors. Key-value pairs are generated by matching the key vector with a predetermined number of candidate vectors. The enhanced NLP model, using prompt learning, is repurposed to perform a next-sentence prediction that predicts which of the candidate vectors is logically related to the schema key. Based on the next-sentence prediction, the discrete portion of text identified as the schema key and portion of text determined to be logically related thereto are output.

20 Claims, 9 Drawing Sheets

(51) Int. Cl.
   *G06F 18/2413*   (2023.01)
   *G06F 40/30*     (2020.01)
   *G06V 30/19*     (2022.01)

(56) References Cited

U.S. PATENT DOCUMENTS

| | | | | |
|---|---|---|---|---|
| 2022/0382975 | A1* | 12/2022 | Gu | G06F 40/216 |
| 2023/0153342 | A1* | 5/2023 | Jayaraman | G06N 5/04 |
| | | | | 706/12 |
| 2023/0274092 | A1* | 8/2023 | Sastre Martinez | |
| | | | | G06F 18/23213 |
| | | | | 704/9 |
| 2024/0273094 | A1* | 8/2024 | Seul | G06F 16/2443 |
| 2024/0362415 | A1* | 10/2024 | Geckt | G06Q 10/1097 |

FOREIGN PATENT DOCUMENTS

| CN | 112418209 A | 2/2021 |
|---|---|---|
| CN | 112819003 B | 8/2021 |
| CN | 114022891 A | 2/2022 |
| CN | 114359921 A | 4/2022 |
| CN | 114694158 A | 7/2022 |

OTHER PUBLICATIONS

Li, L. et al., "An End-to-End OCR Text Re-organization Sequence Learning for Rich-text Detail Image Comprehension," InEuropean Conference on Computer Vision, Aug. 23, 2020, pp. 85-100, Springer, Cham.

Liu, P. et al., "Pre-train, Prompt, and Predict: A Systematic Survey of Prompting Methods in Natural Language Processing," arXiv preprint, arXiv:2107.13586. Jul. 28, 2021.

"System and Method of Automatic Generation of Syntactic and Semantic Glossary in Invoice Processing," [online] IP.com Prior Art Database, Technical Disclosure IPCOM000264852D, Jan. 31, 2021, retrieved from the Internet: <https://priorart.ip.com/IPCOM/000264852>, 15 pg.

Mell, P. et al., The NIST Definition of Cloud Computing, National Institute of Standards and Technology, U.S. Dept. of Commerce, Special Publication 800-145, Sep. 2011, 7 pg.

* cited by examiner

INFORMATION EXTRACTION AND IMAGE RE-ORDERING USING PROMPT LEARNING AND MACHINE-READING COMPREHENSION

BACKGROUND

This disclosure relates to textual processing, and more particularly, to extracting information from, and re-ordering textual images of, documents using machine learning.

Optical character recognition (OCR) is widely used to extract information from printed documents, such as computerized receipts, invoices, bank statements, printouts, email, and various other types of documents. OCR output is typically digitized for electronically storing, searching, and editing various printed records. A frequent OCR task is to extract information in the form of unstructured text-based data from an image and convert text into it structured data. Structured data typically includes key text values.

One approach for extracting information from a textual image is to use a pre-structured information template to adjust the image and identify a sub-image, and then use OCR to extract text inside the sub-image. The image can be adjusted to a fixed angle and size using affine, perspective, or other corrective techniques. The sub-image can be identified within a preset, fixed position interval. The extracted text is automatically associated with a key corresponding to the fixed position interval to form a key-value pair.

Another approach for extracting information from a textual image is to first identify all portions of text within an image, and then use information extraction, entity recognition, or other methods to process the text into a form for performing natural language processing (NLP). NLP is used to generate a key-value structure based on the data generated by processing the text.

With both approaches, however, there are distinct disadvantages. The first approach has several disadvantages. One is the difficulty generating the necessary information template. Generating the information template is not only difficult, it also is very labor intensive. A serious limitation is that the information template must be modified whenever the style of text from which information is to be extracted changes even slightly. A significant difficulty with the second approach is a lack of semantic relationship between information of interest (valued interest) and a corresponding key. Noise in the form of useless text is generated, and more fundamentally, accuracy in identifying key information is considerably diminished.

SUMMARY

In one or more embodiments, a method includes generating, with a semantic encoder of a pre-trained natural language processing (NLP) model, a plurality of semantic vectors that encode discrete portions of text extracted from a document. Each semantic vector uniquely encodes one portion of text identified as a schema key with one other portion of text. The method includes determining, with the pre-trained NLP model, for each semantic vector, a semantic similarity between the schema key and other portion of text encoded therein. The semantic similarity is based on respective positions within the document of the schema key and other discrete portion of text. The method includes generating an enhanced NLP model by re-training the pre-trained NLP using the semantic vectors. Each semantic vector used for the re-training is labeled according to the semantic similarity of the semantic vector. The method includes re-encoding, using the enhanced NLP model, each of the discrete portions of text into re-encoded vectors, including re-encoding the portion of text identified as the schema key as a key vector. The method includes generating, using the enhanced NLP model, key-value pairs by matching the key vector with a predetermined number of re-encoded vectors identified by the enhanced NLP model as candidate vectors. The method includes repurposing the enhanced NLP model, using prompt learning, to perform a next-sentence prediction that predicts which of the candidate vectors is logically related to the schema key, and outputting, based on the next-sentence prediction, the discrete portion of text identified as the schema key and portion of text encoded by the candidate vector logically related thereto.

In one aspect, a discrete portion of text within a document is determined by the enhanced NLP model to be logically related to another discrete portion of text identified as a schema key, and a restructured image of the other document is generated. In the restructured image of the document, the discrete portion of text identified as a schema key and the discrete portion of text logically related thereto are aligned with one another in a predetermined manner.

In another aspect, distances between each pair of discrete portions of text extracted from the document are determined based on position data indicating coordinates of bounding boxes around each discrete portion of text. Based on the distances, the semantic similarity between the text identified as the schema key and other discrete portion of text is determined.

In another aspect, the distances between portions of text are determined by computing Manhattan distances between each pair of discrete portions of text based on the position data.

In another aspect, the NLP model and enhanced NLP model are configured, respectively, as a Robustly Optimized BERT approach (RoBERTa) to the Bidirectional Encoder Representations from Transformers (BERT) model, and an enhanced RoBERTa.

In another aspect, discrete portions of text and their respective positions within a document are extracted by parsing the document with an optical character recognition (OCR) engine.

In another aspect, the portion of text identified as a schema key comprises multiple sub-portions of text, each of the multiple sub-portions corresponding to a different schema key. Accordingly, the method further comprises disassembling two or more of the multiple sub-portions of text into different text portions of text in response to determining that the two or more sub-portions initially appear in the same discrete portion of text. For each sub-portion of text identified as a schema key, another discrete portion of text logically related thereto is determined with the enhanced NLP model.

In one or more embodiments, a system includes a processor configured to initiate executable operations as described within this disclosure.

In one or more embodiments, a computer program product includes one or more computer readable storage mediums having program code stored thereon. The program code is executable by a processor to initiate executable operations as described within this disclosure.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
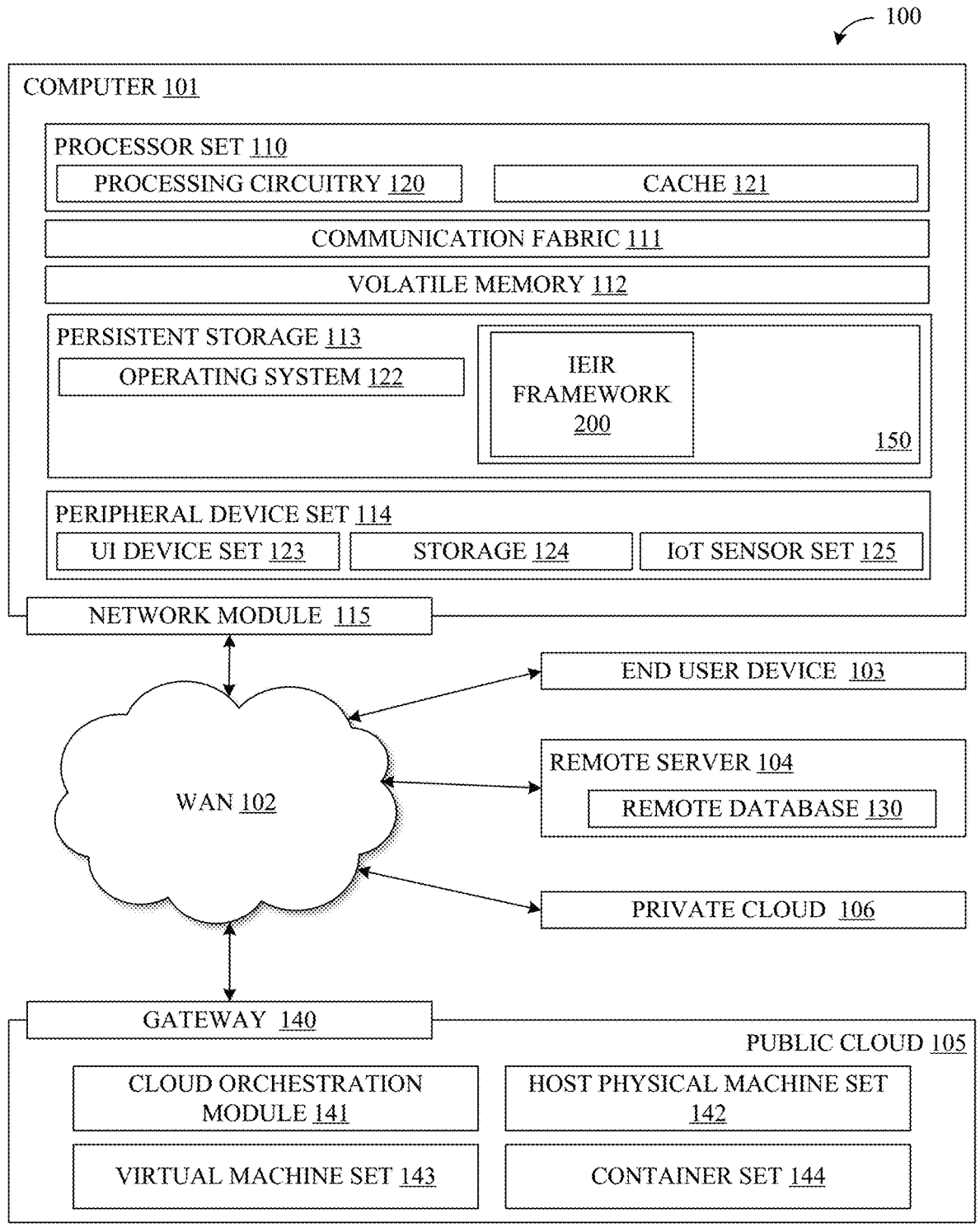
FIG. 1 illustrates an example of a computing environment that is capable of implementing an information extraction and image re-ordering (IEIR) framework.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to textual processing, and more particularly, to extracting information from, and re-ordering textual images of, documents using machine learning. In accordance with the inventive arrangements described within this disclosure, methods, systems, and computer program products are provided that are capable of identifying and extracting critical information, and re-ordering the presentation of the information within a document. The information extracted, according to a predetermined schema, may be the more important information among all other information in the document. The extracted information can be used to generate an image in which the logically related information is aligned.

The inventive arrangements utilize machine learning, including a newly presented enhanced natural language processing (NLP) methodology. In one aspect, a pre-trained NLP model is enhanced by fine-tuning the model using machine learning. The NLP model is fine-tuned using data that combines semantic information and position information pertaining to discrete portions of text within example documents used to fine-tune the model. The fine-tuning is based on the combination of semantic and position information, which links logically related portions of text based on their respective positions within the document. The NLP model is trained through machine learning, using labeled examples, to associate one or more key portions of text with one or more semantically related portions of text based on their respective positions. As trained, the NLP model may learn to associate a key portion of text with another portion of text positioned anywhere within the document. Closeness alone does not necessarily mean that one portion of text is related to another. Depending on the structure of the document, a first portion of text (e.g., key) may be related semantically to a second portion though the second portion is positioned some distance from the first. The NLP model learns iteratively through machine learning to recognize the position where the semantically related second portion of text is most likely found within the document.

In another aspect, distinct portions of text are vectorized into a vector space of semantic vectors. The semantic vectors are labeled based on the semantic similarity determined based, in part, on the location information. Labeling the vectors based on position information, rather than adding position vectors to the semantic vectors directly, avoids distorting or destroying the vector distribution of the pre-trained NLP model, and enables fine-tuning the model for enhanced predictive accuracy.

In still another aspect, the inventive arrangements utilize prompt learning and perform a next-sentence prediction to predict a logical relationship between portions of text.

In yet another aspect, the inventive arrangements utilize prompt learning to re-organize or re-structure portions of text to rewrite portions of text in sentence from for additional processing. Rewritten text is processed utilizing machine reading comprehension to identify semantically related portions of text.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Where considered appropriate, reference numbers are repeated among the figures to indicate corresponding, analogous, or like features.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code in block 150 involved in performing the inventive methods, such as information extraction and image re-ordering (IEIR) framework 200 implemented as executable program code or instructions. IEIR framework 200 is capable of identifying and extracting critical information, and re-ordering the presentation of the information within a document. With the IEIR framework 200, information is extracted according to a predetermined schema for distinguishing key or critical information from other information in the document. IEIR framework 200 can rewrite text in the form of a series of queries and answers and process the rewritten text using machine reading comprehension to determine which portions of text in a document are semantically related with one another.

Computing environment 100 additionally includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and IEIR framework 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (e.g., a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (e.g., private, community or public cloud types), often respectively implemented by different vendors.

Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
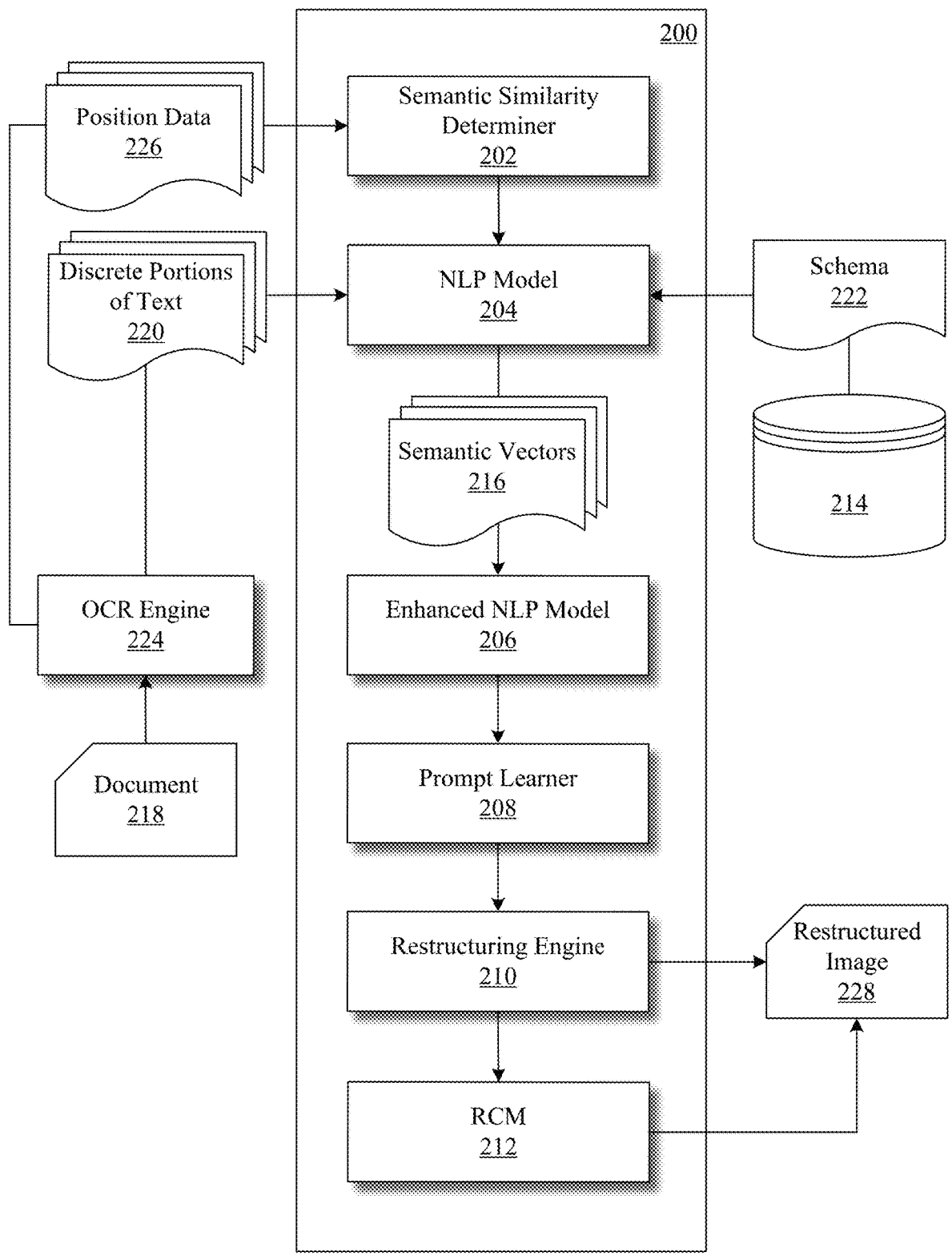
FIG. 2 illustrates an example architecture for the executable IEIR framework of FIG. 1.

FIG. 2 illustrates an example architecture for the executable IEIR framework 200 of FIG. 1. In the example of FIG. 2, IEIR framework 200 includes semantic similarity determiner 202, NLP model 204, enhanced NLP model 206, prompt learner 208, restructuring engine 210, and reading comprehension module (RCM) 212. In the example architecture, IEIR framework 200 may access database 214, which stores various schema for processing different types of documents. The different types of documents, for example, can include routine documents such as sales receipts, purchase orders, shipping invoices, and the like, as well as more specialized documents such as business reports, contracts, regulatory filings, and the like.

Figure 3:
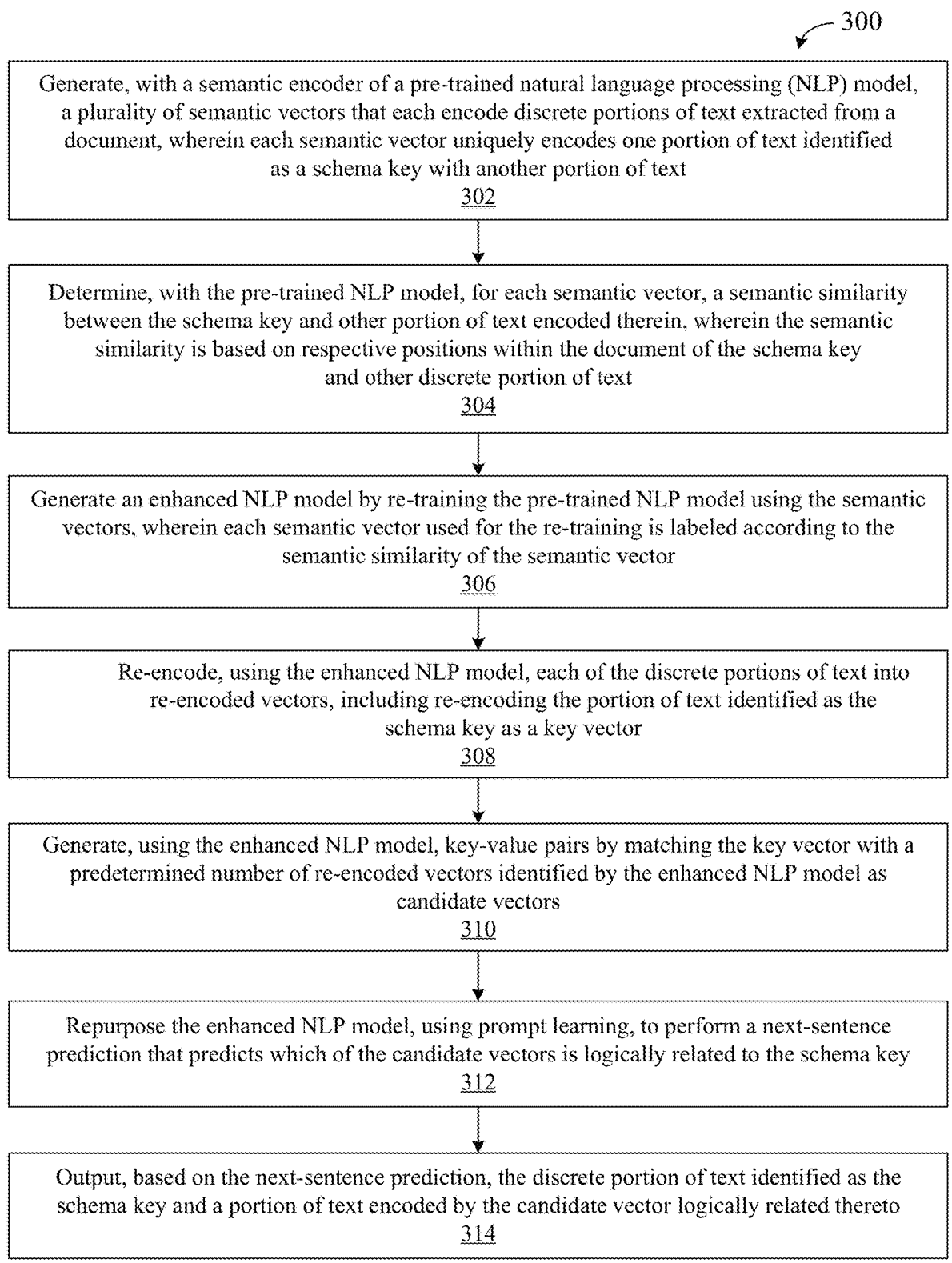
FIG. 3 illustrates an example method of operation of the IEIR framework of FIGS. 1 and 2.

FIG. 3 illustrates an example method 300 of operation of the IEIR framework 200 of FIGS. 1 and 2. Referring to FIGS. 2 and 3 collectively, in block 302, a plurality of semantic vectors 216 is generated using NLP model 204 to encode discrete portions of text 220 extracted from document 218. Document 218 is one of multiple documents that are processed during the training of NLP model 204 using machine learning. Each of semantic vectors 216 uniquely encodes one portion of text identified as a schema key and encodes with the schema key one of the other portions of text. Each of the other portions of text within document 218 is encoded with the schema key as a schematic vector, which, as described below is labeled according to the semantic similarity of the portion of text with the schema key. The schema key is illustratively identified by schema 222, which is retrieved from database 214. The portions of text are illustratively extracted from document 218 using optical character recognition (OCR) engine 224, which communicatively couples with IEIR framework 200. OCR engine 224 additionally extracts position data 226 from document 218. Position data 226 specifies the position of each of the discrete portions of text 220 as arranged within document 218.

In one or more embodiments, NLP model 204 is implemented as a pre-trained, transformer-based machine learning model, such as the Bidirectional Encoder Representations from Transformers (BERT) model. In certain embodiments, NLP model 204 is implemented using the Robustly Optimized BERT pre-training Approach (RoBERTa). Using the semantic base-model encoder of RoBERTa, semantic vectors 216 are generated by vectorizing discrete portions of text 220 parsed from document 218 by OCR engine 224.

In block 304, NLP model 204 determines for each of semantic vectors 216 a semantic similarity between the semantic key of the vector and the other vector component, namely another of the discrete portions of text 220 encoded therein. That is, each semantic vector encodes the text identified as a schema key along with another of the discrete portions of text 220. Each semantic vector thus comprises a component embedding the schema key and a component embedding the other portion of text. Each semantic vector's semantic similarity corresponds to the relatedness between the two components of the semantic vector.

A semantic vector's semantic similarity is based on a distance between the schema key and other portion of text encoded in the semantic vector. The distance is determined based on position data 226 extracted by OCR engine 224 and fed into semantic similarity determiner 202. In certain arrangements position data 226 comprises the coordinates of bounding boxes enclosing each of the discrete portions 220 of text within document 218. In some arrangements, the distance between the schema key and other portion of text encoded in a semantic vector is determined by computing a Manhattan distance between the locations within document 218 of the portion of text identified as the schema key and the other portion of text encoded in the same semantic vector.

In block 306, enhanced NLP model 206 (e.g., enhanced RoBERTa) is generated using semantic vectors 216, each of which is labeled according to the semantic similarity of each semantic vector. In certain embodiments, the label is a soft label. The soft label is a numerical value between zero and one and indicates the probability or likelihood that the schema key and other text-embedded component of the semantic vector are related to one another. In some embodiments, the soft label of a semantic vector is computed as a sigmoid function of the distance between locations within document 218 of the text identified as the schema key and the other portion of text encoded in the same semantic vector. In other embodiments, other probabilistic functions can be used for computing the semantic similarity that is used for soft labeling each of semantic vectors 216.

Note that although the semantic similarity of discrete portions of text 220 is based on position data 226 (e.g., distances between distinct text portions) the position or distances between portions of text are not added as position vectors directly to the semantic vectors, but rather used to label the semantic vectors. The semantic vectors comprise a vector space—a mathematical structure with certain properties (e.g., closure under vector addition and scalar multiplication) represented as a data structure—based on pre-training NLP model 204. The distribution of vectors (semantic vectors) within the vector space determines the semantic similarity of the text embedded in semantic vectors 216. Adding position vectors to semantic vectors 216 directly is likely to distort or destroy the distribution. Thus, IEIR framework 200 does not add the position or distance information directly to semantic vectors 216 but instead uses the information to soft label the vectors. This approach captures the information without distorting or destroying the underlying distribution of semantic vectors 216 within the vector space for determining logical or semantic similarity between the vectors. Once soft labeled accordingly, semantic vectors 216 are used to fine-tune NLP model 204 though supervised machine learning, thereby generating enhanced NLP model 206.

In block 308, the semantic encoder of enhanced NLP model 206 is used to re-encode each of the discrete portions of text 220 of document 218. The portion of text identified as the schema key is re-encoded as a key vector. Each of the other portions of text are also re-encoded by the semantic encoder of enhanced NLP model 206. The other portions of text are also re-encoded as vectors for additional natural language processing by enhanced NLP model 206.

In block 310, enhanced NLP model 206 generates key-value pairs from the key vector and other re-encoded vector. The key-value pairs match the key vector with a predetermined number n of candidate vectors. Recall that enhanced NLP model 206 was generated by re-training NLP model 204 using semantic vectors 216, which were soft labeled based on position data 226. Accordingly, enhanced NLP model 206 is capable of making a probabilistic determination of the semantic or logical relatedness of each re-encoded vector to the key vector, thereby identifying candidate vectors. The n (e.g., four) predetermined candidate vectors are the candidate vectors determined by enhanced NLP model 206 to be most likely related to the key vector.

In block 312, enhanced NLP model 206 is repurposed using prompt learner 208 to perform next-sentence predictions. Using enhanced NLP model 206 as a foundation model, prompt learner 208 repurposes the pre-trained model without extensive additional training. Prompt learner 208 injects natural language cues (prompts) into enhanced NLP model 206. Taking advantage of enhanced NLP model 206's probabilistic modeling, prompt learner 208 enables enhanced NLP model 206 to perform predictions without extensive re-training. With prompt learning, a template, [key] SEP [value], is used to modify an input to enhanced NLP model 206. With the template, [key] SEP [value], a previously modeled input (key) is followed by a prompt (SEP), and the repurposed NLP model 206 probabilistically supplies the remaining text (value) to generate a final text string (e.g., [key="the Total" ] SEP="is" [value=$12.99]). Prompt learning allows the language model of enhanced NLP model 206 (based on that of NLP model 204) to be pre-trained using extensive raw text and then perform few-shot or zero-shot learning using the prompts injected by prompt learner 206.

The next-sentence prediction, in block 312, predicts which of the n predetermined candidate vectors is logically related to the schema key. The next-sentence prediction is probabilistic in nature and indicates which of the discrete portions of text 220 is most likely the text that is logically linked with the text identified as the schema key.

In block 314, the discrete portion of text from document 218 identified as the schema key is output along with that portion of text determined by the next-sentence prediction to be logically related to the schema key.

Once IEIR framework 200 is trained, it is available for run-time use with a newly presented document. With another document, IEIR framework 200 can determine, with the enhanced NLP model 206, that a discrete portion of text from the other document is logically related to another discrete portion of text from the other document that is identified as a schema key.

IEIR framework 200 optionally includes restructuring engine 210. Restructuring engine 210 can generate restructured image 228 of the other document. Within the restructured image, the discrete portion of text from the other document that is identified as a schema key and the discrete portion of text from the other document logically related thereto are aligned with one another in a predetermined manner. For example, IEIR framework 200 may process a document such as a machine-generated bill that includes multiple lines. If the text "Grand Total" is identified as a schema key and determined by enhanced NLP model 206 to be semantically linked with the text "$12.59," then restructuring engine 210 can align both portions of text on a single line, making the total amount of the bill readily discernable to a reader. (See FIGS. 4A-4E.)

A document processed by IEIR framework 200 may include text that has multiple portions that are each identified as a different schema key by schema 222, as selected from database 214 for the specific document. If the document as originally structured presents multiple schema keys closely aligned within a portion of text, IEIR framework 200 performs procedures in blocks 302-314 to identify that portion or portions of text that include segments that are likely semantically related to each of the distinct schema keys. IEIR framework 200 can identify distinct schema keys based on keyword matching of words contained in schema 222.

IEIR framework 200 identifies distinct schema keys using named entity recognition. In certain embodiments, IEIR framework 200 implements a deep learning-based named entity recognition that is capable of determining semantic and syntactic relationships between words within a given vocabulary and that can be trained through machine learning to analyze topic-specific words. In other embodiments, IEIR framework 200 implements a machine learning algorithm that performs multi-class classifications, the classification model trained using a set of labeled training examples. IEIR framework 200 in other embodiments identifies multiple schema keys using a conditional random field, a probabilistic model for performing named entity recognition. In still other embodiments, IEIR framework 200 identifies schema keys in a text by performing a word search to determine whether one or more characters, words, or terms in the text match a character, word, word stem, or term listed and organized by category in schema 222.

Having identified multiple schema keys, IEIR disassembles, or separates out, each distinct schema key and processes each individually, either sequentially or in parallel, to determine candidate matches. The matches semantically link a distinct segment, or sub-portion, of text with each of the individual schema keys.

To ascertain which segments, or sub-portions, of the semantically related portion of text correspond with which schema keys, prompt learning 208 can inject prompts into the text and restructuring engine 210 can restructure text into sentences, that comprise a schematic key and a candidate. The sentences are fed into RCM 212 which uses machine reading comprehension to formulate a query-response (QA). Based on the QA formulation, different sentences comprising schema keys and candidate text are processed by RCM 212. RCM 212 applies natural language processing to determine the sentence formulation that is most likely a correct one.

For example, a machine-generated bill may include two predetermined schema keys, "payment amount" and "payment date," that appear in the same portion of text. The bill may include another portion such as "$300 on Mar. 15, 2022" that the procedures in blocks 302-314 identify as likely corresponding to the schema keys. The IEIR framework 200's task is to semantically link "$300" with the schema key "Payment Amount" and "Mar. 15, 2022" with the schema key "Payment Date." Appling machine-reading comprehension, RCM 202 rejects a QA sentence formulation, "payment amount is Mar. 15, 2022," as unlikely correct. RCM 212, however, accepts the QA formulation "payment amount is $300" as likely correct. Likewise, applying machine-reading comprehension, RCM 212 rejects the QA sentence formulation "payment date is $300" in favor of "payment date is Mar. 15, 2022" as the semantically correct one. (See FIG. 5.)

Accordingly, IEIR framework 200, is capable of disassembling two or more of multiple sub-portions of text into different text portions of text in response to determining that the two or more sub-portions initially appear in the same discrete portion of text. For each sub-portion of text identified as a schema key, IEIR framework 200 determines with enhanced NLP model 206 in conjunction with RCM 212 another discrete portion of text that is logically related thereto.

Figure 4A:
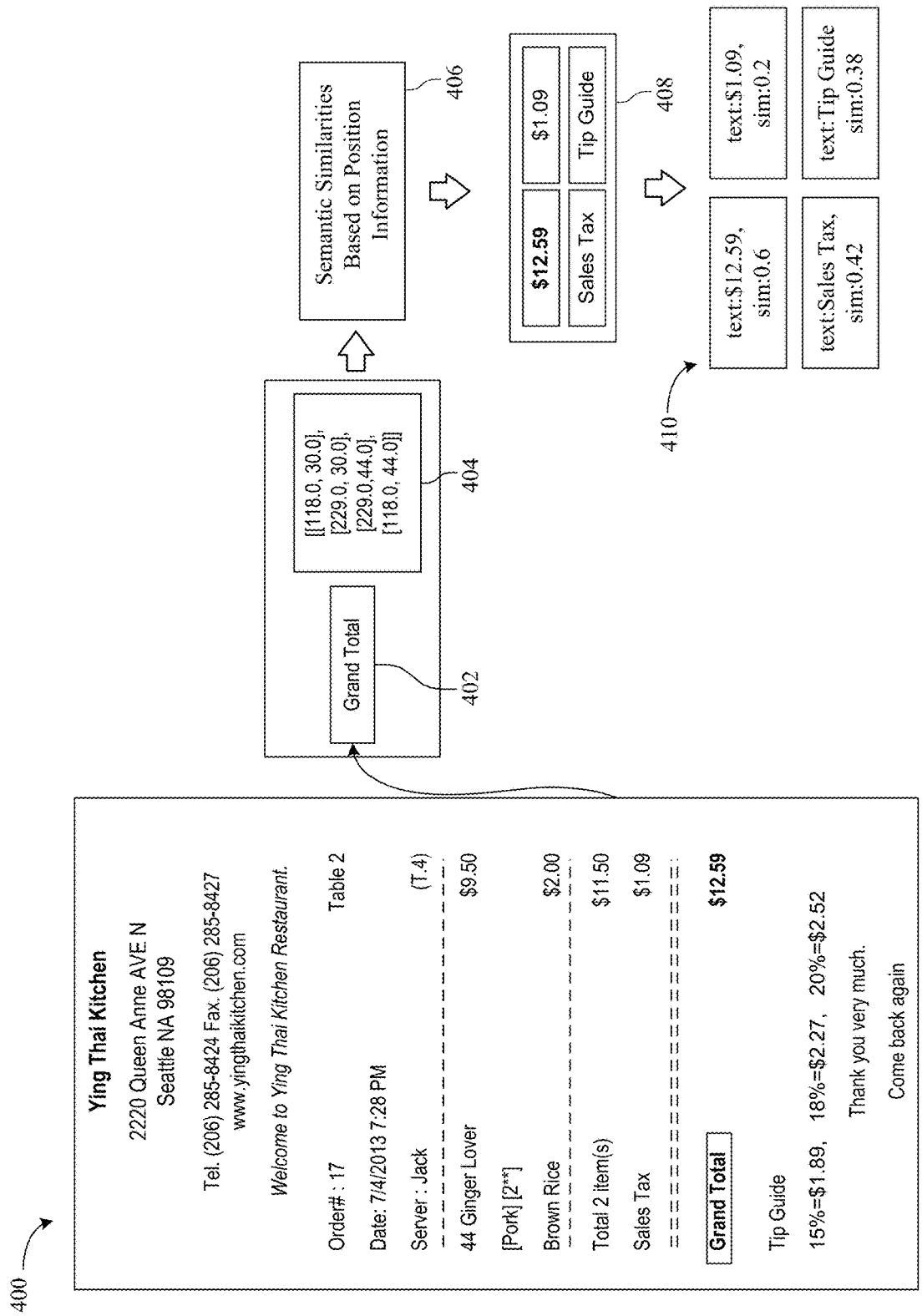
FIGS. 4A-4E illustrate certain operative aspects of the IEIR framework of FIGS. 1 and 2.

FIGS. 4A-4E illustrate certain operative aspects of IEIR framework 200. Illustratively, the operative aspects are applied with respect to example document 400, which comprises a bill for an order in which the bill includes the name and address of an establishment, items ordered, prices of the items, and other information. The operative aspects illustratively begin with the extraction by OCR 224 of discrete portions of text and corresponding position information. As schematically illustrated in FIG. 4A, the extracted information includes text 402—identified by schema 222 as a schema key—and coordinates 404 of a bounding box around text 402. Based on position information (e.g., bounding box coordinates) extracted by OCR 224 for other portions of text within document 400, semantic similarity determiner 202 determines semantic similarities 406 between the schema key and the other portions of text. Each semantic similarity is a value between zero and one, corresponding to the likelihood of a semantic similarity between text 402, "Grand Total" (the schema key), and another portion of text.

Illustratively, four portions of text 408 are determined by semantic similarity determiner 202 to be positive samples in that the semantic similarities 410 of each is greater than zero. Text portions 408, the positive samples, are the values $12.59 and $1.09, and the text "Sales Tax" and "Tip Guide," whose semantic similarities 410 are 0.6, 0.2, 0.42, and 0.32, respectively. The remaining portions of text in document 400 are negative samples, whose semantic similarities are each zero.

Figure 4B:
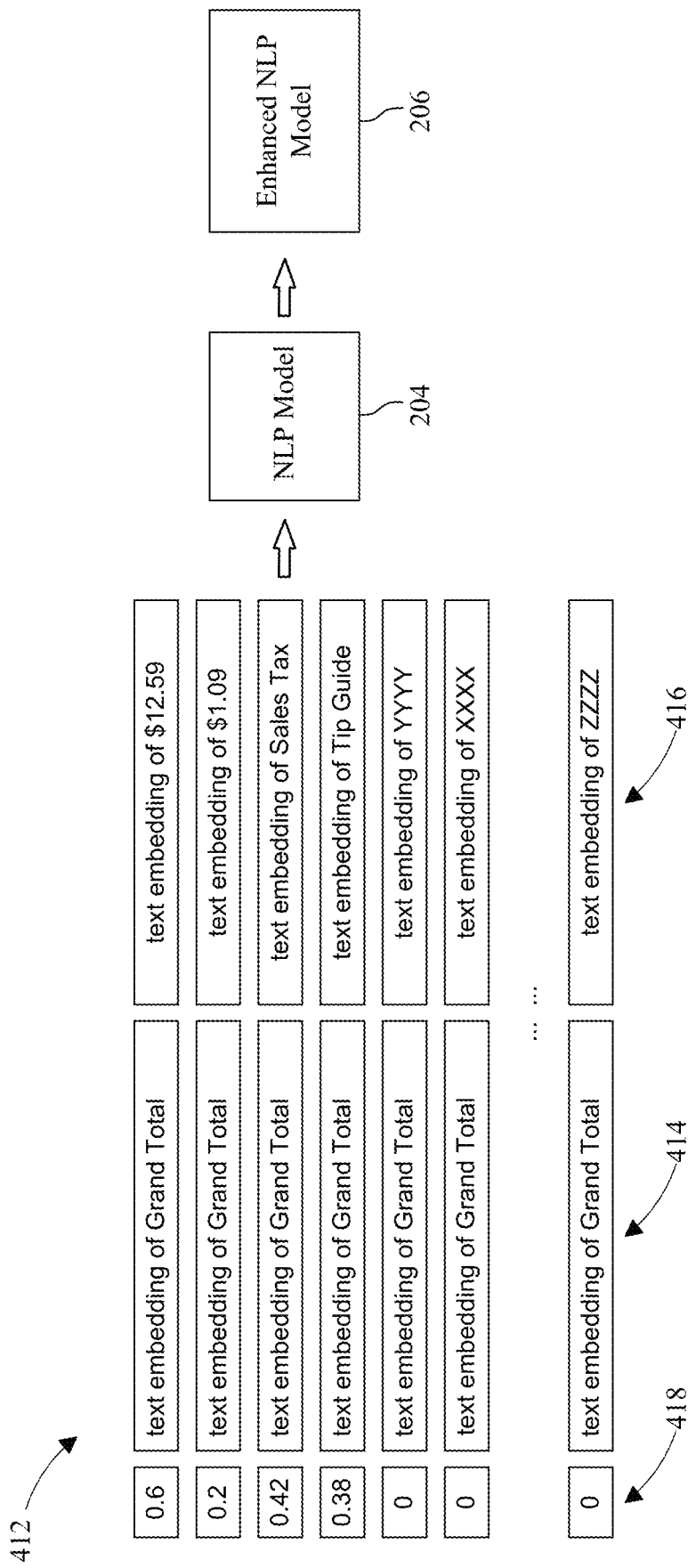

The base encoder of NLP model 204 encodes the text of document 400 into semantic vectors 412, illustrated in FIG. 4B. Each semantic vector includes a component 414 corresponding to text 402, "Grand Total" (the schema key), and another portion of text 416. Soft labels 418 are applied to each of semantic vectors 412 according to the semantic similarity of each semantic vector. Semantic vectors 412, as labeled, are fed into NLP model 204. As schematically illustrated in FIG. 4B, enhanced NLP model 206 is generated by fine-tuning NLP model 204 using semantic vectors 412, as labeled, to re-train NLP model 204 as an enhanced version, enhanced NLP model 206.

Figure 4C:
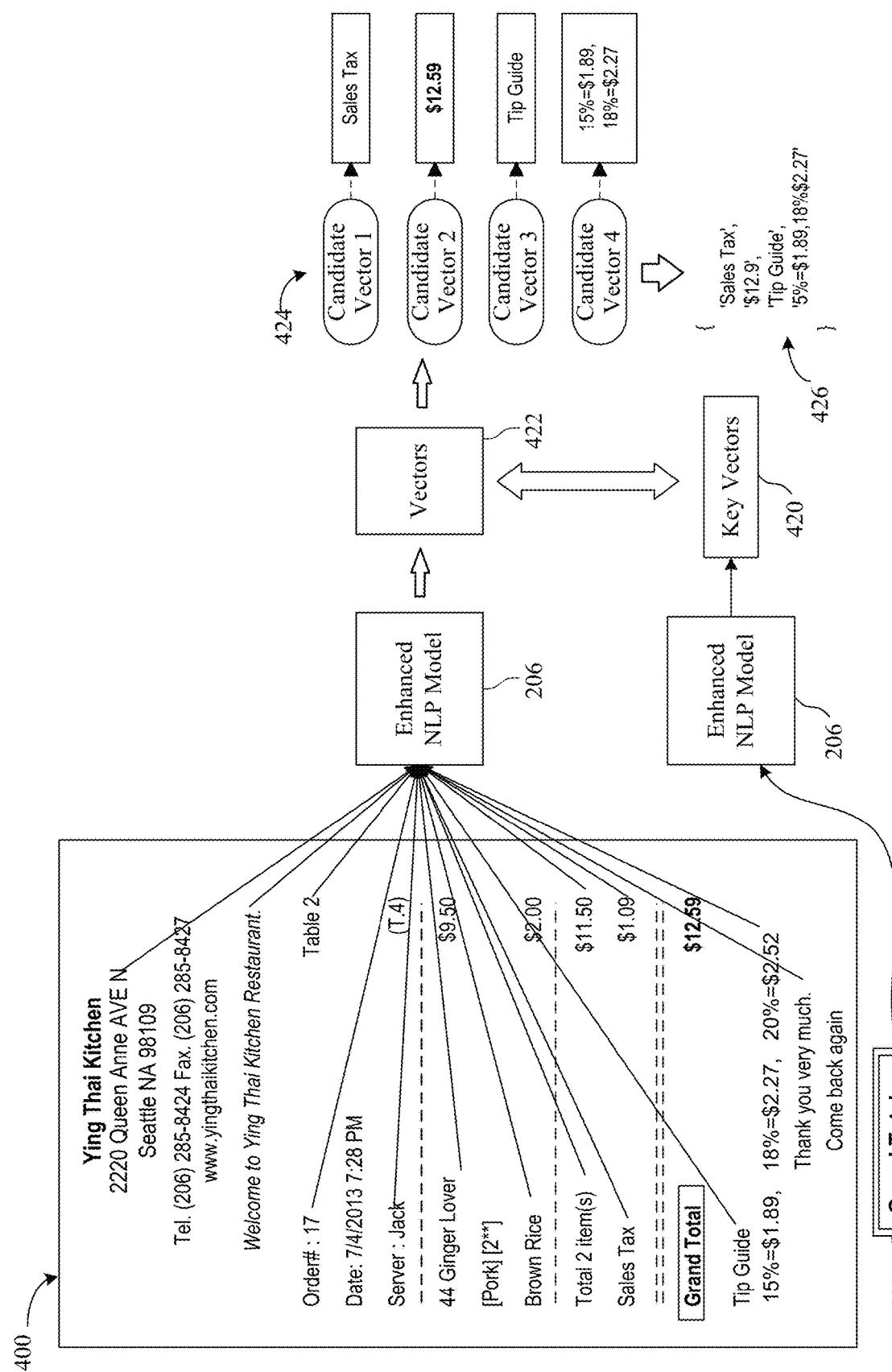

As schematically illustrated in FIG. 4C, each of the discrete portions of text of document 400 are re-encoded using enhanced NLP model 406. Text 402 is re-encoded as key vector 420, and the other portions of text are re-encoded as vectors 422. Enhanced NLP model 206, generates key-value pairs 424 by matching key vector 420 with a predetermined number of re-encoded vectors 422 that are identified by the enhanced NLP model 406 based on semantic similarity as candidate vectors 424. Candidate vectors 242 correspond to text portions 426 that are determined to be likely related semantically to text 402, "Grand Total," the schema key.

Figure 4D:
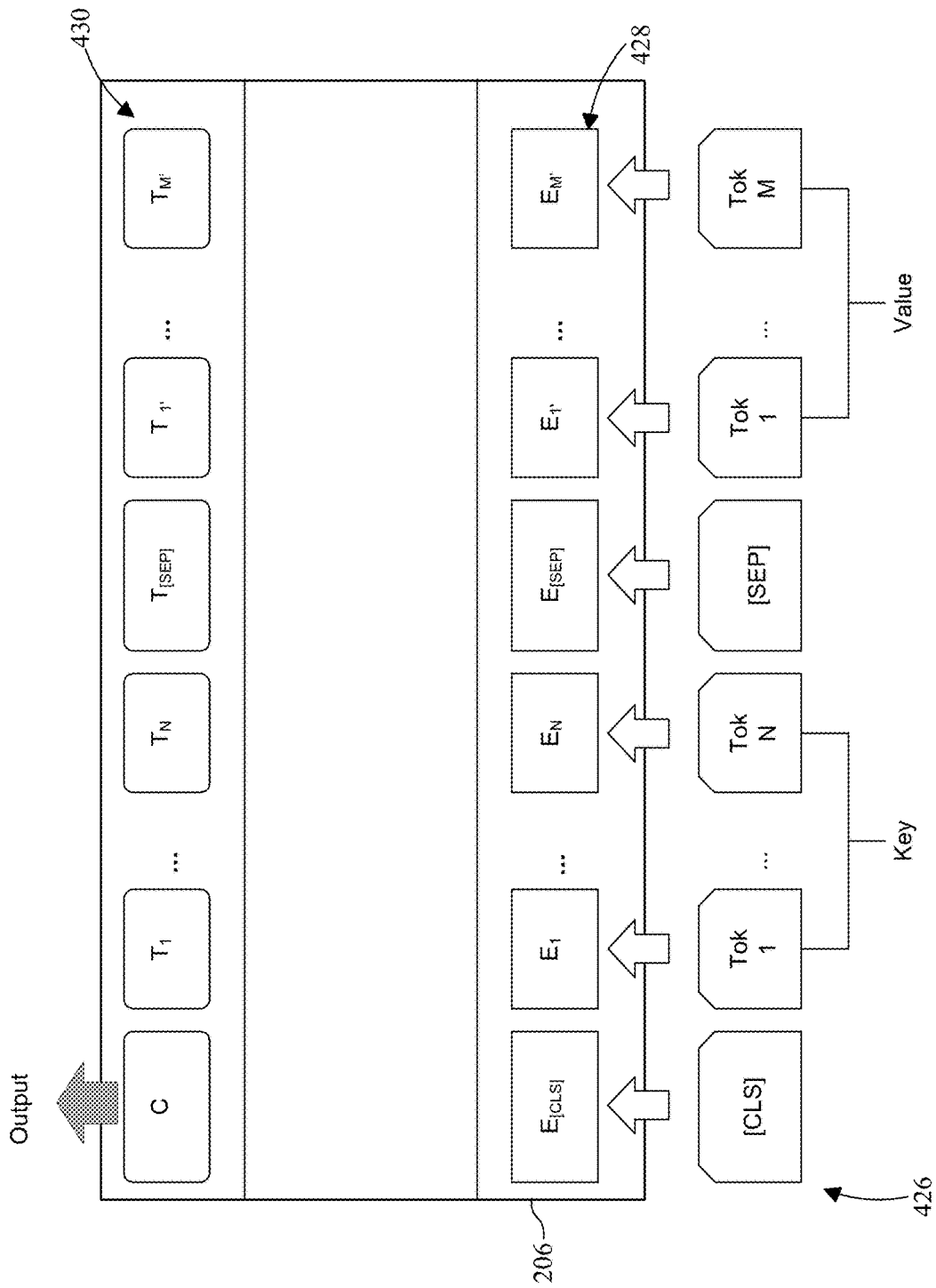
Figure 4E:
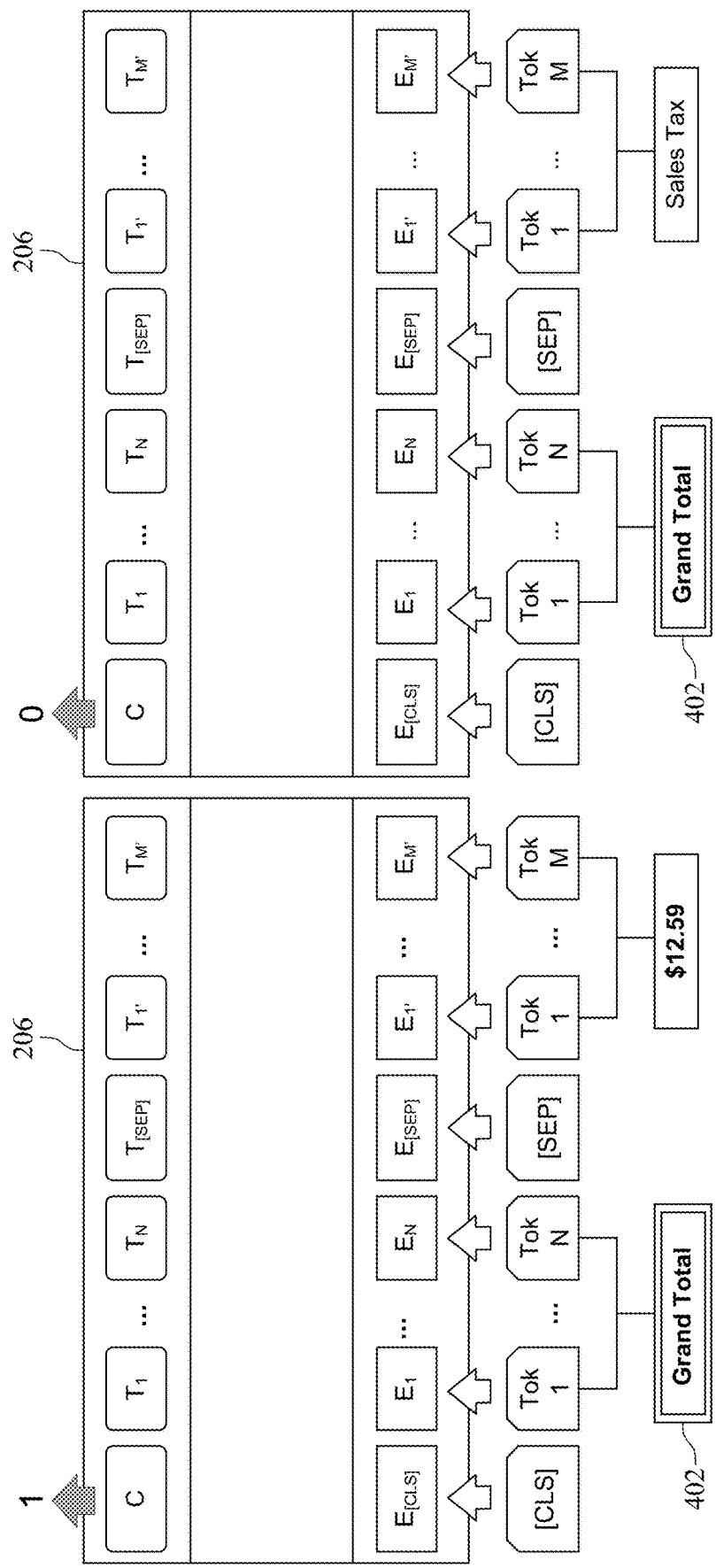

FIG. 4D illustrates template 426 used to modify key-value pairs 424 for input to enhanced NLP model 206 repurposed by prompt learner 208 for performing a next-sentence prediction. Template 426 comprises tokens 1 through N corresponding to the key and tokens I through M corresponding to the value, along with label token CLS and token [SEP]. The tokens are encoded by the base encoder of enhanced NLP model 206, generating encoding 428. Encoding 428 is processed by transformers 430 of enhanced NLP model 206, generating a zero-or-one output indicating whether the value of a key-value pair is semantically related to the key. An output of one indicates a semantic relatedness, a zero indicates no relatedness. FIG. 4E illustrates that enhanced NLP model 206 determines that text 402, "Grand Total," is related to the text $12.59, as indicated by the output one.

Other text example, "Sale Tax," is determined by enhanced NLP model 206 to be unrelated, as indicated by the output of zero.

Figure 5:
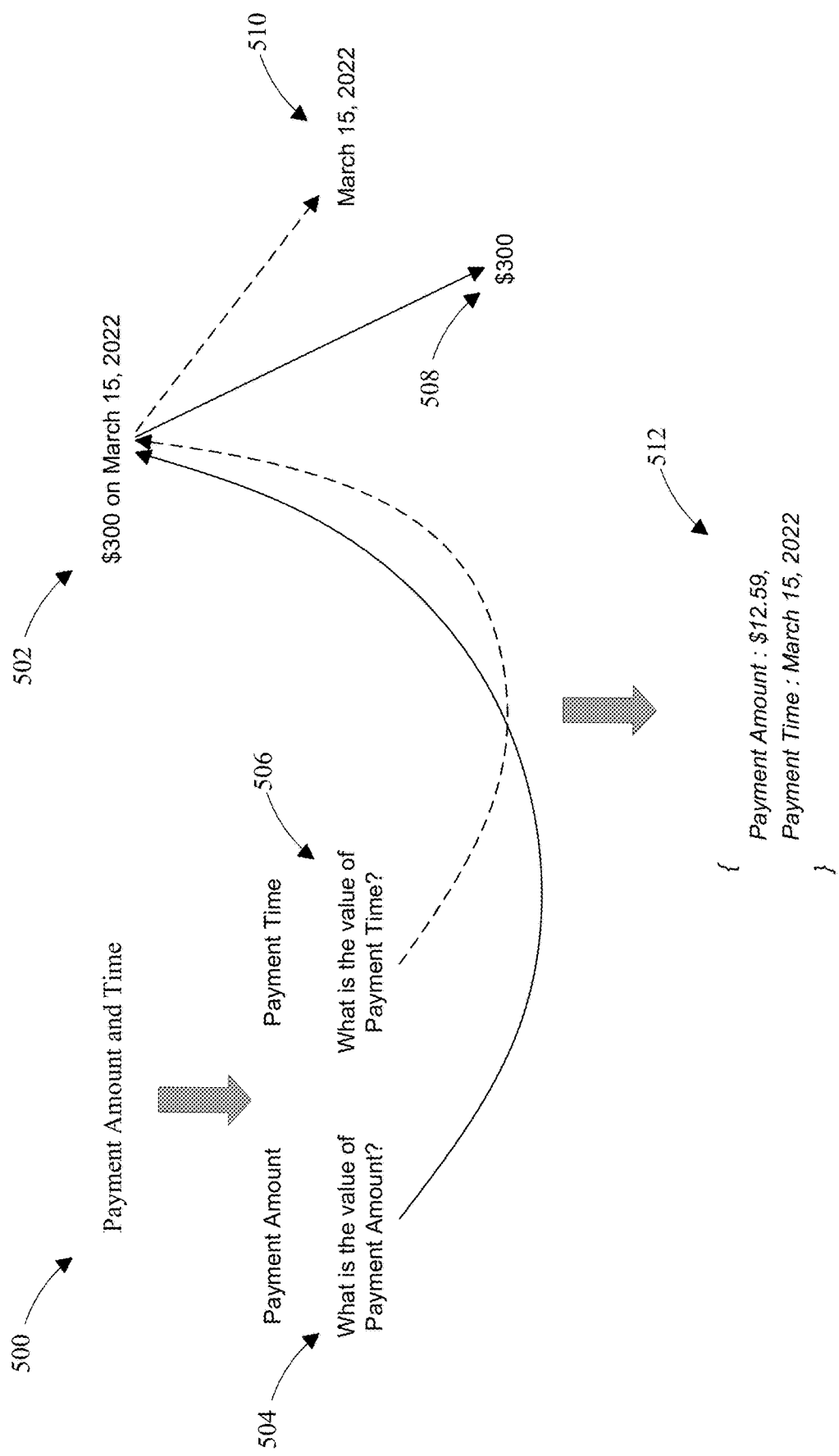
FIG. 5 illustrates certain operative aspects of IEIR framework of FIGS. 1 and 2.

FIG. 5 illustrates the disassembly of text 500 of an example document that includes two different schema keys, "Payment Amount and Time," which appear in the same portion of text. The example document also includes a portion of text 502, "$300 on Mar. 15, 2022." IEIR framework 200 is illustratively tasked with correctly aligning each schema key with a semantically related sub-portion of text 502. The different portions of text are processed by enhanced NLP model 206 as already described, which links text 500 and text 502 as semantically related. Based on prompt learning implemented with prompt learner 208, text 500 is disaggregated and presented as two distinct queries 504, "What is the value of the Payment Amount?", and 506, "What is the value of Payment Time?" Reading comprehension by RCM 212 accurately predicts that a logical answer to query 504 is text 508, "$300," and that a logical response to query 506 is text 510, "Mar. 15, 2022." Based on the predictions of RCM 212, restructuring engine 210 generates output 512.

The terminology used herein is for the purpose of describing particular embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    generating, with a semantic encoder of a pre-trained natural language processing (NLP) model, a plurality of semantic vectors that encode discrete portions of text extracted from a document, wherein each semantic vector uniquely encodes one portion of text identified as a schema key with another portion of text;
    generating an enhanced NLP model by re-training the pre-trained NLP using the semantic vectors, wherein each semantic vector used for the re-training is labeled according to a semantic similarity determined between the portions of text of the semantic vector based on position data;
    re-encoding, using the enhanced NLP model, each of the discrete portions of text into re-encoded vectors, including re-encoding the portion of text identified as the schema key as a key vector;
    generating, using the enhanced NLP model, key-value pairs by matching the key vector with a predetermined number of re-encoded vectors identified by the enhanced NLP as candidate vectors;
    selecting from the candidate vectors a selected vector that is logically related to the schema key by repurposing the enhanced NLP model, using prompt learning, to perform a next-sentence prediction that predicts the selected vector.

2. The method of claim 1, further comprising:
    determining, with the pre-trained NLP model, for each semantic vector, the semantic similarity between the schema key and other portion of text encoded therein based on the position data, wherein the position data indicates respective positions within the document of the schema key and other portion of text.

3. The method of claim 1, further comprising:
    determining, with the enhanced NLP model, that a discrete portion of text within another document is logically related to another discrete portion of text from the other document identified as a schema key; and
    generating a restructured image of the other document, wherein the discrete portion of text from the other document that is identified as a schema key and the discrete portion of text from the other document logically related thereto are aligned with one another in a predetermined manner.

4. The method of claim 1, further comprising:
    determining, based on the position data, distances between each pair of discrete portions of text extracted from the document, wherein the position data indicates coordinates of bounding boxes around each discrete portion of text; and
    determining, based on the distances, the semantic similarity between the text identified as the schema key and each other discrete portion of text.

5. The method of claim 4, wherein the determining the distances is performed by computing Manhattan distances between each pair of discrete portions of text based on the position data.

6. The method of claim 1, wherein the NLP model and enhanced NLP model are configured, respectively, as Robustly Optimized BERT approach (RoBERTa) to a Bidirectional Encoder Representations from Transformers (BERT) model, and an enhanced RoBERTa.

7. The method of claim 1, wherein the discrete portions of text and the respective positions are extracted by parsing the document with an optical character recognition (OCR) engine.

8. The method of claim 1, wherein the portion of text identified as a schema key comprises multiple sub-portions of text, each of the multiple sub-portions corresponding to a different schema key, and further comprising:
    disassembling two or more of the multiple sub-portions of text into different text portions of text in response to determining that the two or more sub-portions initially appear in a same discrete portion of text; and
    for each sub-portion of text identified as a schema key, determining with the enhanced NLP model another discrete portion of text logically related thereto.

9. A system, comprising:
    one or more processors, wherein the one or more processors are configured to initiate operations including:
        generating, with a semantic encoder of a pre-trained natural language processing (NLP) model, a plurality of semantic vectors that encode discrete portions of text extracted from a document, wherein each semantic vector uniquely encodes one portion of text identified as a schema key with another portion of text;

generating an enhanced NLP model by re-training the pre-trained NLP using the semantic vectors, wherein each semantic vector used for the re-training is labeled according to a semantic similarity determined between the portions of text of the semantic vector based on position data;

re-encoding, using the enhanced NLP model, each of the discrete portions of text into re-encoded vectors, including re-encoding the portion of text identified as the schema key as a key vector;

generating, using the enhanced NLP model, key-value pairs by matching the key vector with a predetermined number of re-encoded vectors identified by the enhanced NLP as candidate vectors;

selecting from the candidate vectors a selected vector that is logically related to the schema key by repurposing the enhanced NLP model, using prompt learning, to perform a next-sentence prediction that predicts the selected vector.

10. The system of claim 9, wherein the one or more processors are configured to initiate operations further including:

determining, with the pre-trained NLP model, for each semantic vector, the semantic similarity between the schema key and other portion of text encoded therein based on the position data, wherein the position data indicates respective positions within the document of the schema key and other portion of text.

11. The system of claim 9, wherein the one or more processors are configured to initiate operations further including:

determining, with the enhanced NLP model, that a discrete portion of text within another document is logically related to another discrete portion of text from the other document identified as a schema key; and generating a restructured image of the other document, wherein the discrete portion of text from the other document that is identified as a schema key and the discrete portion of text from the other document logically related thereto are aligned with one another in a predetermined manner.

12. The system of claim 9, wherein the one or more processors are configured to initiate operations further including:

determining, based on the position data, distances between each pair of discrete portions of text extracted from the document, wherein the position data indicates coordinates of bounding boxes around each discrete portion of text; and determining, based on the distances, the semantic similarity between the text identified as the schema key and each other discrete portion of text.

13. The system of claim 9, wherein the NLP model and enhanced NLP model are configured, respectively, as Robustly Optimized BERT approach (RoBERTa) to a Bidirectional Encoder Representations from Transformers (BERT) model, and an enhanced RoBERTa.

14. The system of claim 9, wherein the discrete portions of text and the respective positions are extracted by parsing the document with an optical character recognition (OCR) engine.

15. The system of claim 9, wherein the portion of text identified as a schema key comprises multiple sub-portions of text, each of the multiple sub-portions corresponding to a different schema key, and wherein the one or more processors are configured to initiate operations further including:

disassembling two or more of the multiple sub-portions of text into different text portions of text in response to determining that the two or more sub-portions initially appear in the same discrete portion of text; and for each sub-portion of text identified as a schema key, determining with the enhanced NLP another discrete portion of text logically related thereto.

16. A computer program product, comprising:

one or more computer-readable storage media and program instructions collectively stored on the one or more computer-readable storage media, the program instructions executable by a processor to cause the processor to initiate operations including:

generating, with a semantic encoder of a pre-trained natural language processing (NLP) model, a plurality of semantic vectors that encode discrete portions of text extracted from a document, wherein each semantic vector uniquely encodes one portion of text identified as a schema key with another portion of text;

generating an enhanced NLP model by re-training the pre-trained NLP using the semantic vectors, wherein each semantic vector used for the re-training is labeled according to a semantic similarity determined between the portions of text of the semantic vector based on position data;

re-encoding, using the enhanced NLP model, each of the discrete portions of text into re-encoded vectors, including re-encoding the portion of text identified as the schema key as a key vector;

generating, using the enhanced NLP model, key-value pairs by matching the key vector with a predetermined number of re-encoded vectors identified by the enhanced NLP as candidate vectors;

selecting from the candidate vectors a selected vector that is logically related to the schema key by repurposing the enhanced NLP model, using prompt learning, to perform a next-sentence prediction that predicts the selected vector.

17. The computer program product of claim 16, wherein the program instructions are executable by the processor to cause the processor to initiate operations further including:

determining, with the pre-trained NLP model, for each semantic vector, the semantic similarity between the schema key and other portion of text encoded therein based on the position data, wherein the position data indicates respective positions within the document of the schema key and other portion of text.

18. The computer program product of claim 16, wherein the program instructions are executable by the processor to cause the processor to initiate operations further including:

determining, with the enhanced NLP model, that a discrete portion of text within another document is logically related to another discrete portion of text from the other document identified as a schema key; and generating a restructured image of the other document, wherein the discrete portion of text from the other document that is identified as a schema key and the discrete portion of text from the other document logically related thereto are aligned with one another in a predetermined manner.

19. The computer program product of claim 16, wherein the program instructions are executable by the processor to cause the processor to initiate operations further including:

determining, based on the position data, distances between each pair of discrete portions of text extracted from the document, wherein the position data indicates coordinates of bounding boxes around each discrete portion of text; and determining, based on the distances, the semantic similarity between the text identified as the schema key and each other discrete portion of text.

20. The computer program product of claim 16, wherein the portion of text identified as a schema key comprises multiple sub-portions of text, each of the multiple sub-portions corresponding to a different schema key, and wherein the program instructions are executable by the processor to cause the processor to initiate operations further including:

disassembling two or more of the multiple sub-portions of text into different text portions of text in response to determining that the two or more sub-portions initially appear in the same discrete portion of text; and for each sub-portion of text identified as a schema key, determining with the enhanced NLP model another discrete portion of text logically related thereto.

* * * * *